(12) United States Patent
Bian et al.

(10) Patent No.: US 10,436,982 B1
(45) Date of Patent: Oct. 8, 2019

(54) WAVEGUIDE BENDS WITH FIELD CONFINEMENT

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/038,868

(22) Filed: Jul. 18, 2018

(51) Int. Cl.
*G02B 6/12* (2006.01)
*G02B 6/125* (2006.01)
*G02B 6/13* (2006.01)

(52) U.S. Cl.
CPC ......... *G02B 6/125* (2013.01); *G02B 6/12004* (2013.01); *G02B 6/13* (2013.01); *G02B 2006/12035* (2013.01); *G02B 2006/12147* (2013.01)

(58) Field of Classification Search
CPC ...... G02B 6/125; G02B 6/13; G02B 6/12004; G02B 2006/12035; G02B 2006/12147
See application file for complete search history.

(56) References Cited

U.S. PATENT DOCUMENTS

| | | | |
|---|---|---|---|
| 3,785,717 A * | 1/1974 | Croset | G02B 6/12002 333/113 |
| 5,138,676 A | 8/1992 | Stowe et al. | |
| 5,243,672 A | 9/1993 | Dragone | |
| 6,724,968 B2 * | 4/2004 | Lackritz | B82Y 30/00 385/131 |
| 6,859,587 B2 | 2/2005 | Nikonov et al. | |
| 6,901,196 B2 | 5/2005 | Takahashi et al. | |
| 7,013,067 B2 | 3/2006 | Ghiron et al. | |
| 7,016,587 B2 | 3/2006 | Kubby et al. | |
| 7,095,920 B1 * | 8/2006 | Little | G02B 6/12002 385/131 |
| 7,109,739 B2 | 9/2006 | Gothoskar et al. | |
| 7,262,852 B1 | 8/2007 | Gunn, III et al. | |
| 7,317,853 B2 | 1/2008 | Laurent-Lund et al. | |
| 7,941,014 B1 | 5/2011 | Watts et al. | |
| 8,213,751 B1 | 7/2012 | Ho et al. | |
| 9,122,006 B1 | 9/2015 | Roth et al. | |
| 9,234,854 B2 | 1/2016 | Assefa et al. | |
| 9,726,818 B1 | 8/2017 | Yap et al. | |
| 9,746,607 B2 | 8/2017 | Collins et al. | |
| 9,778,416 B2 | 10/2017 | Meade et al. | |
| 2002/0191916 A1 | 12/2002 | Frish et al. | |

(Continued)

OTHER PUBLICATIONS

Yusheng Bian et al., "Waveguide-To-Waveguide Couplers With Multiple Tapers", U.S. Appl. No. 15/968,997, filed May 2, 2018.

(Continued)

*Primary Examiner* — Ellen E Kim
(74) *Attorney, Agent, or Firm* — Thompson Hine LLP

(57) ABSTRACT

Structures including waveguide bends, methods of fabricating a structure that includes waveguide bends, and systems that integrate optical components containing different materials. A first waveguide bend is contiguous with a waveguide, and a second waveguide bend is spaced in a vertical direction from the first waveguide bend. The second waveguide bend has an overlapping arrangement with the first waveguide bend in a lateral direction.

20 Claims, 9 Drawing Sheets

(56) References Cited

U.S. PATENT DOCUMENTS

| | | |
|---|---|---|
| 2003/0223672 A1 | 12/2003 | Joyner et al. |
| 2004/0114869 A1 | 6/2004 | Fike et al. |
| 2005/0111779 A1 | 5/2005 | Joyner et al. |
| 2005/0123244 A1 | 6/2005 | Block et al. |
| 2010/0059822 A1 | 3/2010 | Pinguet et al. |
| 2011/0267676 A1 | 11/2011 | Dallesasse et al. |
| 2012/0288995 A1 | 11/2012 | El-Ghoroury et al. |
| 2017/0205580 A1* | 7/2017 | Feng .................. G02B 6/125 |

OTHER PUBLICATIONS

Fathpour, S., "Emerging heterogeneous integrated photonic platforms on silicon", 2015, Nanophotonics, 4(1), pp. 143-164.

Shang et al., "Low-loss compact multilayer silicon nitride platform for 3D photonic integrated circuits", Optics Express vol. 23, Issue 16, pp. 21334-21342 (2015).

Sodagar et al., "High-efficiency and wideband interlayer grating couplers in multilayer Si/SiO2/SiN platform for 3D integration of optical functionalities", Optics Express vol. 22, Issue 14, pp. 16767-16777 (2014).

\* cited by examiner

US 10,436,982 B1

WAVEGUIDE BENDS WITH FIELD CONFINEMENT

BACKGROUND

The present invention relates to photonic chips and, more specifically, to structures including waveguide bends, methods of fabricating a structure that includes waveguide bends, and systems that integrate optical components containing different materials.

Photonic chips are capable of being used in many applications and many systems including, but not limited to, data communication systems and data computation systems. A photonic chip integrates optical components, such as waveguides, and electronic components, such as field-effect transistors, into a unified platform. Layout area, cost, and operational overhead, among other factors, may be reduced by integrating both types of components on a single photonic chip.

On-chip communication and sensing may rely on transferring optical signals through waveguides on the photonic chip to other optical components. Optical signals propagate as electromagnetic waves within waveguides using a number of different modes characterized by different properties. The transverse magnetic (TM) mode is dependent upon transverse magnetic waves in which the magnetic field vector is oriented perpendicular to the direction of propagation. The transverse electric (TE) mode is dependent upon transverse electric waves in which the electric field vector is oriented perpendicular to the direction of propagation.

Straight waveguides and waveguide bends, as well as other optical components, may have cores that are fabricated from silicon nitride or single-crystal silicon. For transverse magnetic mode, a waveguide or waveguide bend with a silicon nitride core may have a considerably lower effective index and a significantly weaker field confinement than a waveguide with a single-crystal silicon core. The weak confinement in a silicon nitride core is larger for transverse magnetic mode than for transverse electric mode. As a result, a portion of the mode field may be pulled outside of the silicon nitride core as optical signals propagate through a waveguide bend, which may lead to a higher bending loss in comparison with a waveguide bend of equal bending radius with a single-crystal silicon core. To compensate for the higher bending loss, a waveguide bend with a silicon nitride core may be provided with a larger radius of curvature than a waveguide bend with a single-crystal silicon core, which increases the footprint of waveguide bends with a silicon nitride core. Straight waveguides containing single-crystal silicon have also been observed to have large footprints or to experience significant propagation losses.

Improved structures including waveguide bends, methods of fabricating a structure that includes waveguide bends, and systems that integrate optical components containing different materials are needed.

SUMMARY

In an embodiment of the invention, a structure includes a waveguide, a first waveguide bend that is contiguous with the waveguide, and a second waveguide bend spaced in a vertical direction from the first waveguide bend. The second waveguide bend has an overlapping arrangement with the first waveguide bend in a lateral direction.

In an embodiment of the invention, a method includes forming a waveguide and a first waveguide bend that is contiguous with the waveguide, and forming a second waveguide bend that is spaced in a vertical direction from the first waveguide bend and that overlaps with the first waveguide bend in a lateral direction.

In an embodiment of the invention, a structure includes a waveguide bend comprised of fully-etched single-crystal semiconductor material, a first plurality of optical components, a second plurality of optical components, a first waveguide arranged to couple the first plurality of optical components with the waveguide bend, a second waveguide arranged to couple the second plurality of optical components with the waveguide bend, and a waveguide-to-waveguide coupler coupling the first waveguide to the waveguide bend.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
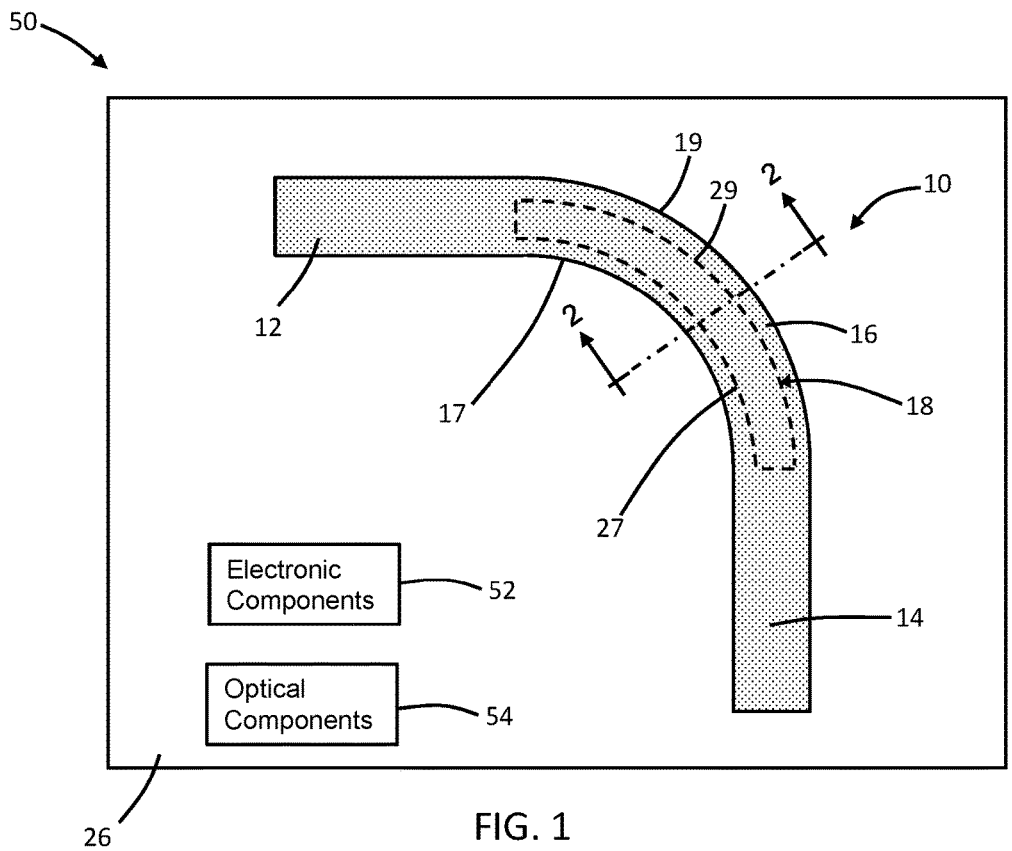
FIG. 1 is a top view of a photonic chip including a waveguide arrangement at a fabrication stage of a processing method in accordance with embodiments of the invention.
Figure 1A:
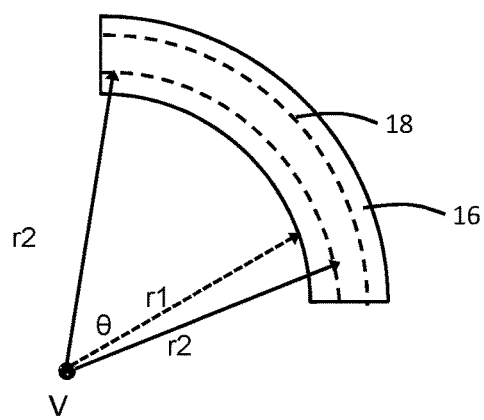
FIG. 1A is a diagrammatic view of a portion of a waveguide arrangement included in the photonic chip of FIG. 1.
Figure 2:
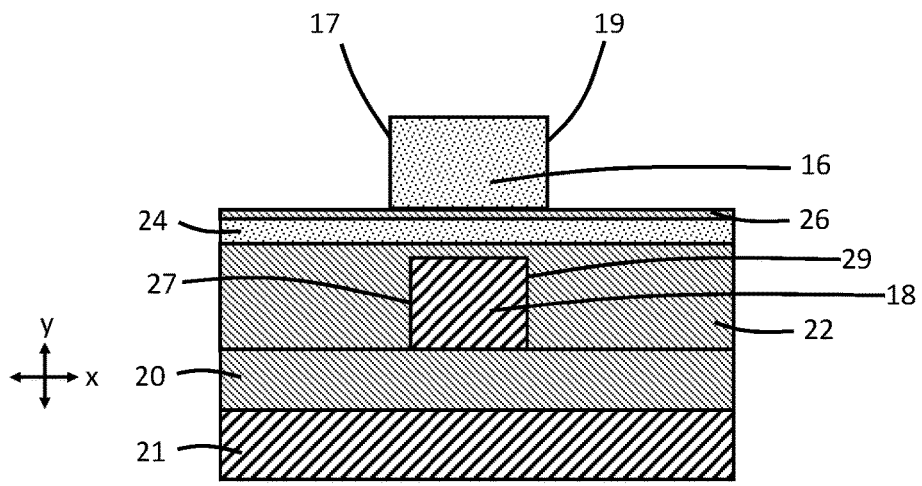
FIG. 2 is a cross-sectional view of the waveguide arrangement taken generally along line 2-2 in FIG. 1.

With reference to FIGS. 1, 1A, 2 and in accordance with embodiments of the invention, a structure 10 includes a waveguide 12, a waveguide 14, a waveguide bend 16, and a waveguide bend 18 that are arranged over a buried oxide (BOX) layer 20 of a silicon-on-insulator (SOI) wafer and dielectric layers 22, 24, 26 are arranged in a multilayer stack on a top surface of the BOX layer 20. The structure 10 may be located in an area of the SOI wafer in which the single-crystal silicon of the device layer has been patterned to form the waveguide bend 18. The dielectric layers 22, 24, 26 are arranged in a vertical direction between the waveguide 12, waveguide 14, and waveguide bend 16, and the waveguide bend 18.

The BOX layer 20 may be composed of an electrical insulator, such as silicon dioxide (e.g., $SiO_2$), and is located over a substrate 21 of the SOI wafer. The dielectric layer 22 and the dielectric layer 26 may be composed of a dielectric material, such as silicon dioxide ($SiO_2$), deposited by atomic layer deposition (ALD) or chemical vapor deposition (CVD). The dielectric layer 24 may be composed of a dielectric material, such as silicon nitride ($Si_3N_4$), deposited by atomic layer deposition (ALD) or chemical vapor deposition (CVD). The BOX layer 20 and dielectric layers 22, 24, 26 may operate as a lower cladding providing confinement for the structure 10.

The waveguides 12, 14 and the waveguide bend 16 are arranged in a vertical direction over the BOX layer 20 and dielectric layers 22, 24, 26. The waveguide bend 16 has one end that is contiguous with the waveguide 12 and an opposite end that is contiguous with the waveguide 14 such that the waveguide bend 16 connects the waveguide 12 with the waveguide 14. The waveguide bend 16 functions to change the propagation direction of optical signals propagating through the structure 10 from, for example, an initial direction within waveguide 12 to a different direction within waveguide 14. The waveguide bend 16 may have an inner radius, r1, that may be measured from a vertex, V, relative to a curved inner surface 17, and that may be a sector of an annulus that also includes a curved outer surface 19 having an outer radius that is greater than the inner radius, r1. The waveguide bend 16 may curve in an arc having a central angle equal to 90°, although other central angles and arc lengths are contemplated. The waveguide 12, waveguide 14, and waveguide bend 16 may be composed of a dielectric material, such as silicon nitride (Si3N4), deposited by chemical vapor deposition (CVD) and patterned by a lithography and etching process from the deposited layer of dielectric material.

The waveguide bend 18 is arranged in a vertical direction over the BOX layer 20 and beneath the dielectric layers 22, 24, 26. In the representative embodiment, the waveguide bend 18 has a non-contacting and overlapping relationship with the waveguide bend 16, and is disconnected from the waveguide 12, waveguide 14, and waveguide bend 16. The waveguide bend 18, which has a curved inner surface 27 and a curved outer surface 29, may be arranged to overlap with the waveguide bend 16. The waveguide bend 18 may have an inner radius, r2, that may be measured as a distance from the vertex, V, relative to the curved inner surface 27, and an outer radius measured as a distance between the curved outer surface 29 and the vertex, V, that is greater than the inner radius, r2. The waveguide bend 18 may have a constant width over its curved length, and the width of the waveguide bend 18 over its curved length may be less than the width of the waveguide bend 16 over its curved length. The outer radius of the waveguide bend 18 may be equal to the sum of the width and the inner radius. In the representative embodiment, the inner radius of the waveguide bend 18 at the curved inner surface 27 is greater than the inner radius of the waveguide bend 16 at the curved inner surface 17, and the outer radius of the waveguide bend 18 at the curved outer surface 29 is less than the outer radius of the waveguide bend 16 at the curved outer surface 19. In alternative embodiments, the width of the waveguide bend 18 may be greater than or equal to the width of the waveguide bend 16. In alternative embodiments, the overlap and/or width may be adjusted such that the inner radius at the curved inner surface 27 of the waveguide bend 18 is less than the inner radius of the curved inner surface 17 of the waveguide bend 16 and/or the overlap may be shifted such that the outer radius at the curved inner surface 27 of the waveguide bend 18 is less than the outer radius of the curved inner surface 17 of the waveguide bend 16.

In an embodiment, the waveguide bend 18 has an arc length at its inner surface 27 and/or outer surface 29 that is concentric or substantially concentric with the arc length of the waveguide bend 16 at its inner surface 17 and/or outer surface 19. The waveguide bend 18 may have a central angle that is equal, or substantially equal, to the central angle of the waveguide bend 16. The waveguide bend 18 may curve in an arc with a central angle equal to 90°, although other central angles are contemplated by the embodiments of the invention.

The shape of the waveguide bend 18 may be characteristic of a sector of an annulus in which the arc lengths of the waveguide bend 18 at its inner and outer radii are arcs representing part of the circumference of respective circles. In alternative embodiments, the waveguide bend 18 may be shaped according to another type of curve, such as curves with a complex curvature that is described by an equation or formula such as a sine function, a cosine function, a spline function, an Euler spiral function, etc., that provides an adiabatic bend that lacks a constant curvature. In an embodiment, the curvature of the waveguide bend 18 may be equal or identical to the curvature of the waveguide bend 16. In an alternative embodiment, the waveguide bend 18 may have a curvature that differs from the curvature of the waveguide bend 16.

The waveguide bend 16 and the waveguide bend 18 contribute to forming a hybrid heterogeneous waveguide structure. In an embodiment, the waveguide bend 18 is composed of the single-crystal semiconductor material of the device layer of the SOI wafer, and is patterned by lithography and etching before the waveguide 12, waveguide 14, and waveguide bend 16 are patterned. In an embodiment, the waveguide bend 18 may be composed of single-crystal silicon.

Figure 3:
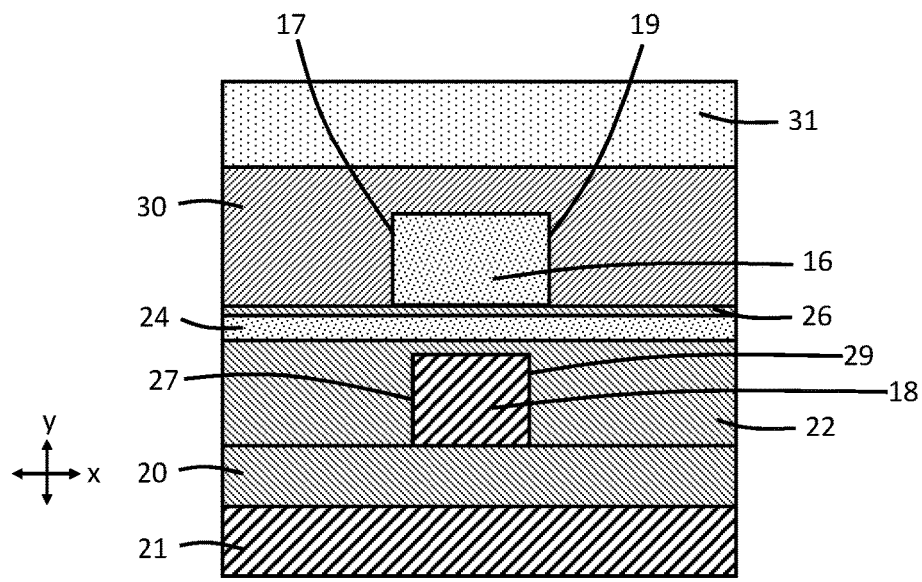
FIG. 3 is a cross-sectional view of the waveguide arrangement at a fabrication stage subsequent to FIG. 2.

With reference to FIG. 3 in which like reference numerals refer to like features in FIG. 2 and at a subsequent fabrication stage of the processing method, the structure 10 may further include a dielectric layer 30 that is formed over the structure 10, and that fills the gaps between the waveguide 12, waveguide 14, and waveguide bend 16. The dielectric layer 30 may have a different composition than the material of the waveguide bend 18. The dielectric layer 30 may be composed of a dielectric material having a different composition than the dielectric material constituting the waveguide 12, waveguide 14, and waveguide bend 16. For example, the dielectric layer 30 may be composed of a dielectric material, such as silicon dioxide ($SiO_2$), deposited by chemical vapor deposition using ozone ($O_2$) and tetraethylorthosilicate (TEOS) as reactants and planarized with chemical-mechanical polishing (CMP).

A back-end-of-line stack, generally indicated by reference numeral 31, may be formed over the dielectric layer 30. The back-end-of-line stack 31 may include one or more dielectric layers composed of a low-k dielectric material or an ultra-low-k dielectric material. The back-end-of-line stack 31 may also include metallization composed of, for example, copper or cobalt that may be arranged in the one or more dielectric layers at locations other than over the structure 10.

The structure 10, in any of its embodiments described herein, may be integrated into a photonic chip 50 (FIG. 1) that includes electronic components 52 and other types of optical components 54. For example, the photonic chip 50 may integrate one or more photodetectors representing optical components 54 that receive optical signals carried by the structure 10 and convert those optical signals into electrical signals that may be processed by the electronic components 52. The electronic components 52 may include field-effect transistors that are fabricated by CMOS front-end-of-line processes using the device layer of the SOI wafer.

Figure 4:
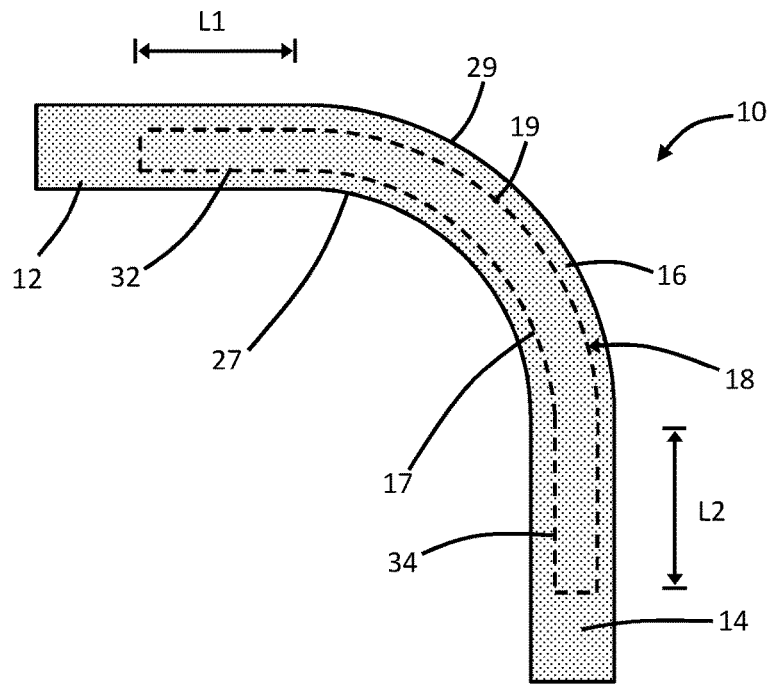
FIGS. 4-8 are top views similar to FIG. 1 of waveguide arrangements for a photonic chip in accordance with alternative embodiments of the invention.

With reference to FIG. 4 in which like reference numerals refer to like features in FIG. 1 and in accordance with alternative embodiments of the invention, the waveguide bend 18 of the structure 10 may be modified to add a waveguide section 32 arranged at an end of the waveguide bend 18 and a waveguide section 34 that is arranged at an opposite end of the waveguide bend 18. The waveguide sections 32, 34 are contiguous with the opposite ends of the waveguide bend 18, and respectively terminate at tips or ends that are arranged beneath the waveguides 12, 14. The waveguide sections 32, 34 may be formed when the waveguide bend 18 is formed by patterning the single-crystal semiconductor material (e.g., single-crystal silicon) and, in an embodiment, are concurrently formed with the waveguide bend 18. The waveguide sections 32, 34 are arranged in a vertical direction beneath the BOX layer 20 and dielectric layers 22, 24, 26.

The waveguide section 32 has a length, L1, and may be straight or linear without bending or curving such that the waveguide section 32 is aligned substantially parallel to the waveguide 12. The waveguide section 34 has a length, L2, and may be straight or linear without bending or curving such that the waveguide section 34 is aligned substantially parallel to the waveguide 14. Each of the waveguide sections 32, 34 may have a constant width over its respective length. In the representative embodiment, the waveguide sections 32, 34 have a uniform width along their respective lengths that is equal to the width of the waveguide bend 18. In an embodiment, the curvature of the waveguide bend 18 may be equal or identical to the curvature of the waveguide bend 16. In an alternative embodiment, the waveguide bend 18 may have a curvature that differs from the curvature of the waveguide bend 16.

Figure 5:
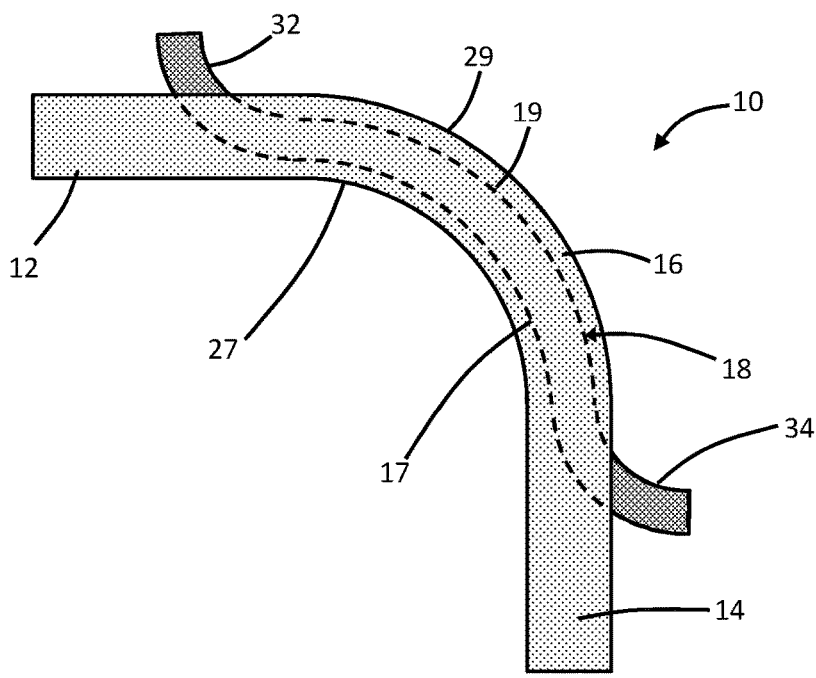

With reference to FIG. 5 in which like reference numerals refer to like features in FIG. 1 and in accordance with alternative embodiments of the invention, one or both of the waveguide sections 32, 34 may be curved along at least a portion of their respective lengths instead of being linear and straight. In the representative embodiment, the waveguide section 32 has a curvature that is the same as the curvature of the waveguide section 34, and the waveguide sections 32, 34 bend in a curvature direction that is opposite to the curvature direction of the waveguide bend 18. In an alternative embodiment, the curvature of the waveguide section 32 may differ from the curvature of the waveguide section 34.

Figure 6:
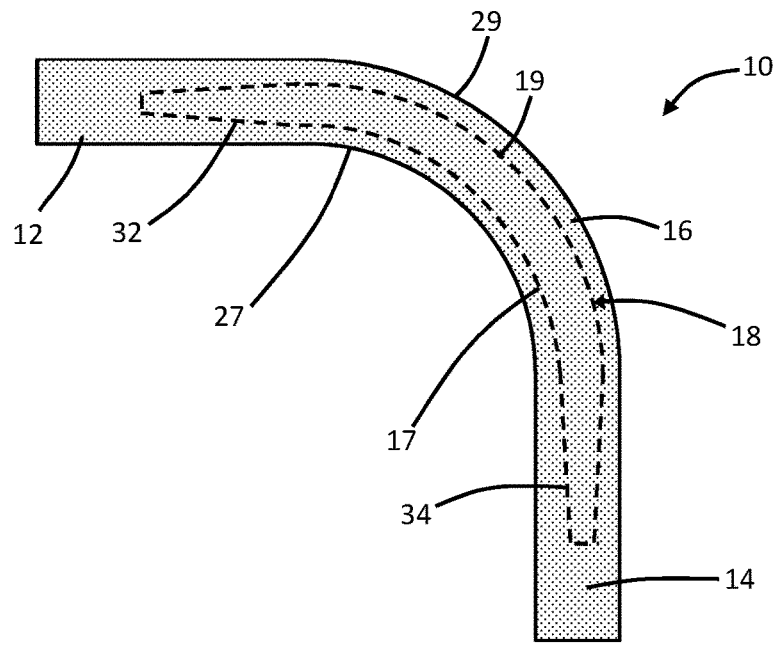

With reference to FIG. 6 in which like reference numerals refer to like features in FIG. 1 and in accordance with alternative embodiments of the invention, one or both of the waveguide sections 32, 34 may be tapered along at least a portion of their respective lengths and extend to terminating tips instead of having a uniform width along their respective lengths. In an embodiment, the width of the waveguide sections 32, 34 decrease with increasing distance from the waveguide bend 18 with the waveguide sections 32, 34 having the largest respective width at their intersection with the waveguide bend 18. In an embodiment, the tapered waveguide sections 32, 34 may also be curved as shown in FIG. 5 to provide a combination of tapering and curvature. In an embodiment, the curvature of the waveguide bend 18 may be equal or identical to the curvature of the waveguide bend 16. In an alternative embodiment, the waveguide bend 18 may have a curvature that differs from the curvature of the waveguide bend 16.

Figure 7:
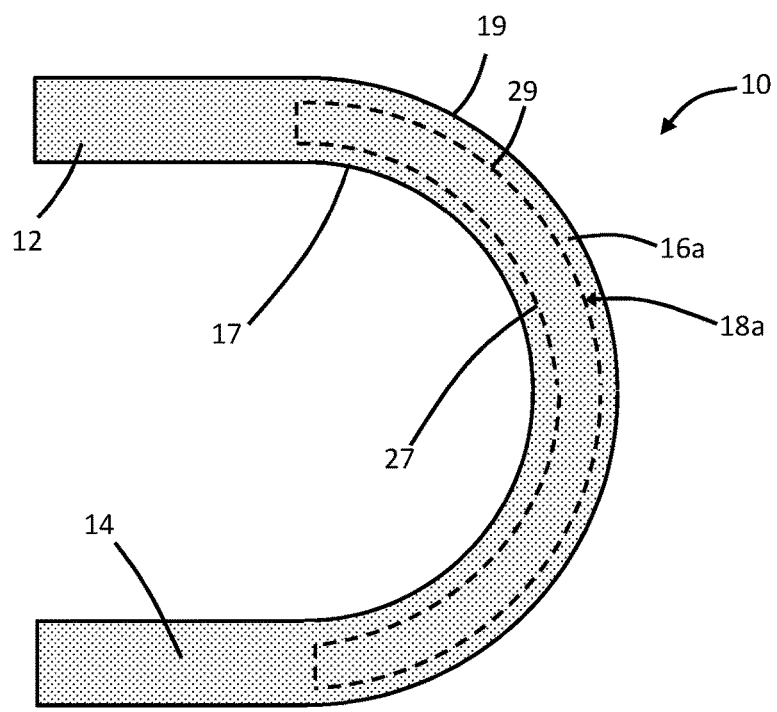

With reference to FIG. 7 in which like reference numerals refer to like features in FIG. 1 and in accordance with alternative embodiments of the invention, a waveguide bend 16a and a waveguide bend 18a may have arc lengths and a value of their central angle that provide changes in direction for light propagation greater than 90°. For example, the change in direction may be 180°. The waveguide bend 18a may be considered to include a plurality of individual sections, each like the waveguide bend 18, that are cascaded to assist with confinement of propagating optical signals in the waveguide bend 16a. For example, a pair of the waveguide bends 18 having equal radii of curvature and a 90° central angle may be butted and cascaded to form the waveguide bend 18a. In an embodiment, the curvature of the waveguide bend 18a may be equal or identical to the curvature of the waveguide bend 16a. In an alternative embodiment, the waveguide bend 18a may have a curvature that differs from the curvature of the waveguide bend 16a.

Figure 8:
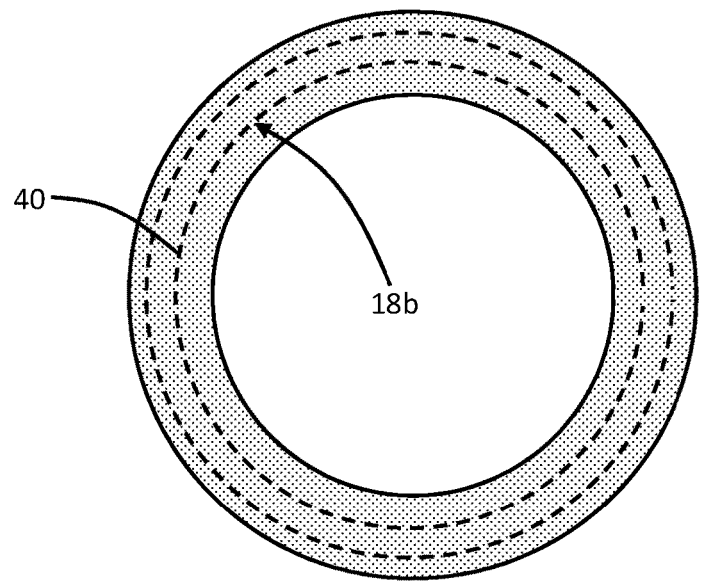

With reference to FIG. 8 in which like reference numerals refer to like features in FIG. 1 and in accordance with alternative embodiments of the invention, the utilization of the waveguide bend 18 may be extended to other types of curved structures, such as ring resonators and arrayed-waveguide gratings. For example, a waveguide bend 18b may be a ring that is substantially concentric with a structure 40 that is also ring-shaped. The radius of curvature of the waveguide bend 18b is less than the radius of curvature of the structure 40, which may function as a ring resonator. The waveguide bend 18b and the structure 40 may have other shapes, such as elliptical shapes, that are non-circular.

Figure 9:
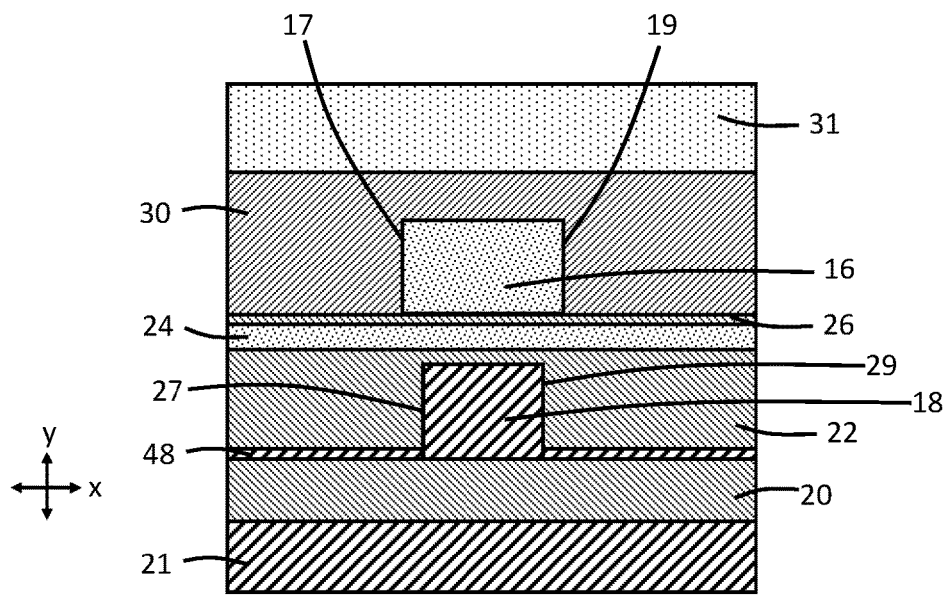
FIG. 9 is a cross-sectional view similar to FIG. 3 of a waveguide arrangement in accordance with alternative embodiments of the invention.

With reference to FIG. 9 in which like reference numerals refer to like features in FIG. 3 and in accordance with alternative embodiments of the invention, the etching process used to pattern the single-crystal semiconductor material to form the waveguide bend 18 may be controlled such that a layer 48 of partially-etched single-crystal semiconductor material of the device layer is arranged on the BOX layer. The layer 48 has a thickness in the vertical direction (i.e., y-direction) that remains as a result of the partial etching, and that is less than the original thickness of the device layer. The structure 10 including the waveguide bend 18 composed of partially-etched single-crystal semiconductor material may be modified to have a construction as shown in any of FIGS. 4-8.

Figure 10:
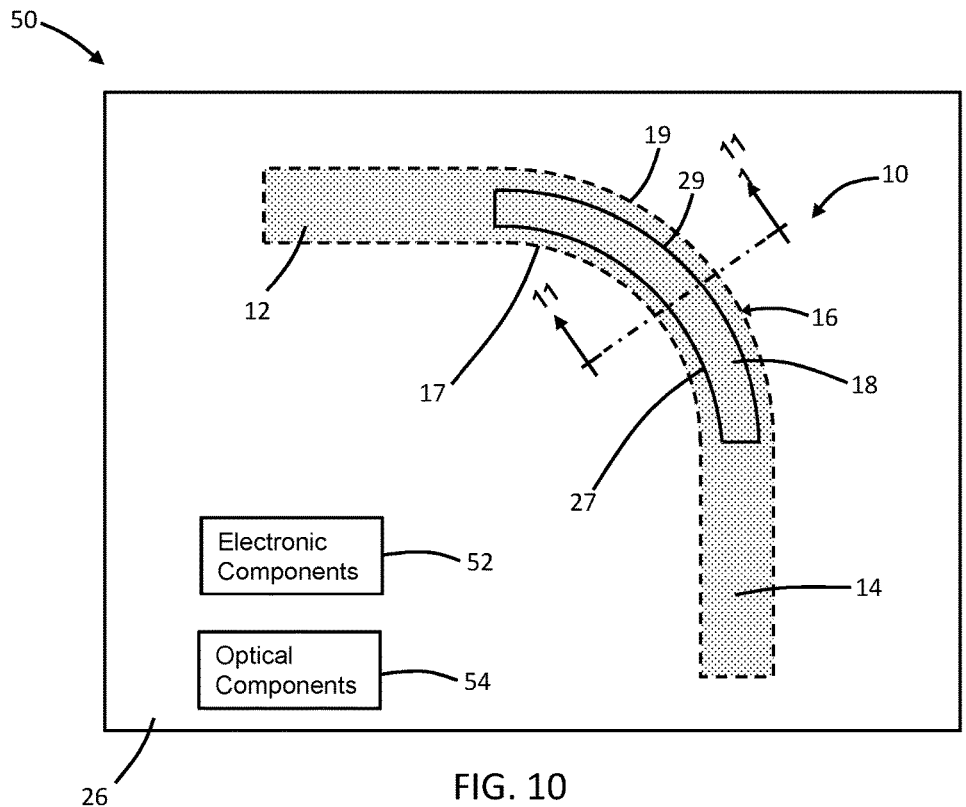
FIG. 10 is a top view of a photonic chip with a waveguide arrangement in accordance with alternative embodiments of the invention.
Figure 11:
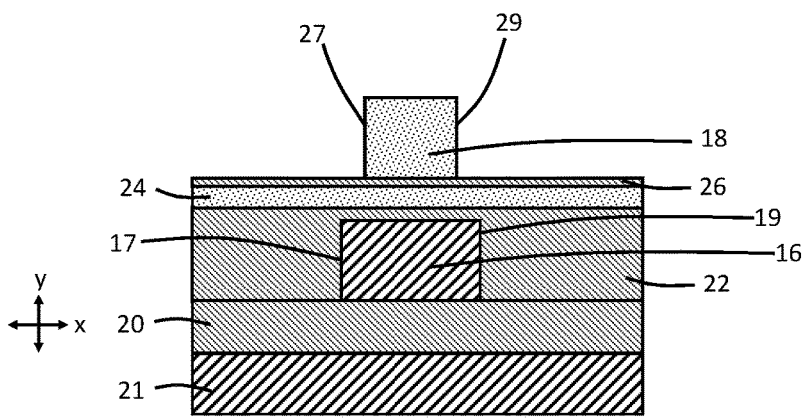
FIG. 11 is a cross-sectional view of the waveguide arrangement taken generally along line 11-11 in FIG. 10.

With reference to FIGS. 10, 11 in which like reference numerals refer to like features in FIG. 1 and in accordance with alternative embodiments of the invention, the composition of the waveguide bend 18 may be altered such that the waveguide bend 18 is composed of the dielectric material, and the composition of the waveguides 12, 14 and waveguide bend 16 may be altered such that the waveguides 12, 14 and waveguide bend 16 are composed of single-crystal semiconductor material that is either fully or partially etched. The waveguide bend 18 is arranged in a vertical direction over the BOX layer 20 and dielectric layers 22, 24, 26, and the waveguide bend 16 is arranged in a vertical direction beneath the BOX layer 20 and dielectric layers 22, 24, 26. The dielectric layer 30 and the back-end-of-line stack 31 may be formed over the structure 10 as described in the context of FIG. 3.

In the representative embodiment, the waveguide bend 18 is narrower in width than the waveguide bend 16, although the embodiments of the invention are not so limited. The structure 10 including the waveguide bend 18 composed of dielectric material may be modified to have a construction as shown in any of FIGS. 4-8, and the waveguides 12, 14 and waveguide bend 16 may include partially-etched single-crystal semiconductor material as shown in FIG. 9.

The embodiments of the waveguide bend 18 described herein may improve confinement of optical signals of the transverse magnetic mode in the core of the waveguide bend 16 and, thereby, may reduce the bending loss in the waveguide bend 16 attributable to, for example, radiation loss and mode-mismatching loss in comparison with an arrangement in which the waveguide bend 18 is absent. Coupling between the waveguide bend 16 and the waveguide bend 18 may improve mode confinement of the optical signals, which may lead to reduced radiation loss through the bends. In addition, the waveguide bend 18 may assist in confining the mode field into the core of the waveguide bend 16, which may lead to decreased mode-mismatching loss. The hybrid heterogeneous waveguide structure may reduce the bend radius for the waveguide bend 16 through the introduction of the waveguide bend 18 and the resulting reduction in the bending loss.

Figure 12:
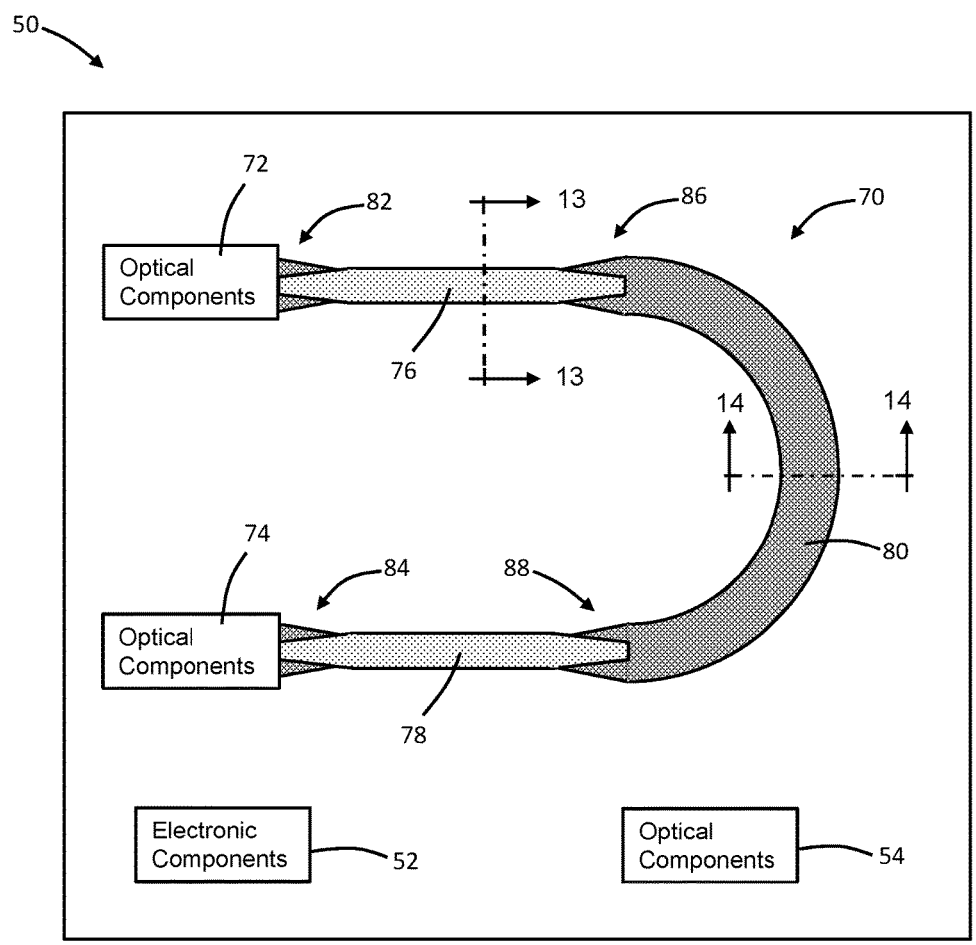
FIG. 12 is a diagrammatic top view of a photonic chip including a system in accordance with embodiments of the invention and in which some layers have been omitted for clarity of description.
Figure 13:
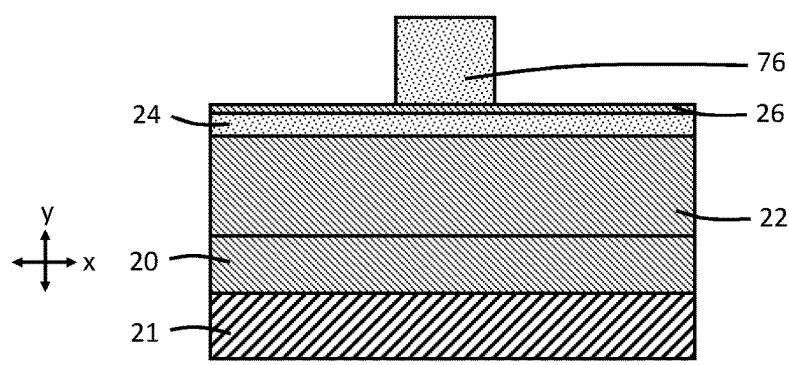
FIG. 13 is a cross-sectional view of a portion of the system taken generally along line 13-13 in FIG. 12.
Figure 14:
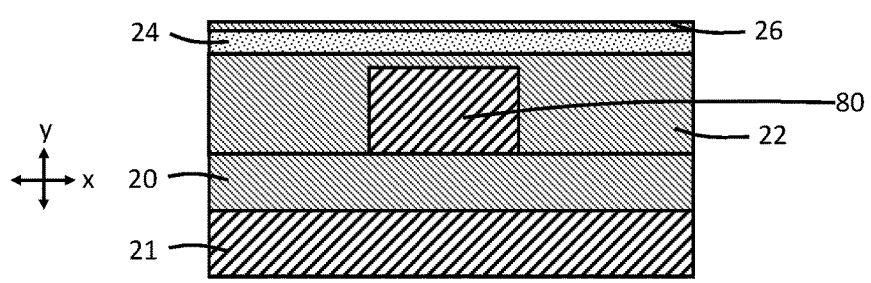
FIG. 14 is a cross-sectional view of a portion of the system taken generally along line 14-14 in FIG. 12.

With reference to FIGS. 12, 13, 14 in which like reference numerals refer to like features in FIGS. 1-3 and in accordance with alternative embodiments of the invention, the photonic chip 50 may include a platform or system 70 that integrates optical components based on different materials. The system 70 includes a set of optical components 72, a set of optical components 74, a waveguide 76, a waveguide 78, a waveguide bend 80, a waveguide-to-waveguide coupler 82 connecting the optical components 72 with the waveguide 76, a waveguide-to-waveguide coupler 84 connecting the optical components 74 with the waveguide 78, a waveguide-to-waveguide coupler 86 connecting the waveguide 76 with the waveguide bend 80, and a waveguide-to-waveguide coupler 88 connecting the waveguide 76 with the waveguide bend 80. The optical components 72 and the optical components 74 may be formed from the same material, such as a single-crystal semiconductor material (e.g., single-crystal silicon). In alternative embodiments, the optical components 72 may be formed from a different material than the optical components 74. The dielectric layer 30 and the back-end-of-line stack 31 may be formed over the system 70 as described in the context of FIG. 3.

The optical components 72 are coupled with the optical components 74 by an arrangement of the waveguide 76, waveguide 78, waveguide bend 80, and waveguide-to-waveguide couplers 82, 84, 86, 88 for the transfer of propagating optical signals on the photonic chip 50. The waveguides 76, 78 may be straight optical components, and the waveguide bend 80 may provide a 180° change in direction of optical signals propagating in the waveguides 76, 78. The waveguide 76, waveguide 78, waveguide bend 80, and waveguide-to-waveguide couplers 82, 84, 86, 88 also constitute optical components of the system 70.

The waveguide 76 may be formed from a dielectric material, such as silicon nitride, different than the material forming the optical components 72, and the waveguide-to-waveguide coupler 82 may intervene to transfer propagating optical signals between the waveguide 76 and the optical components 72. The waveguide 78 may be formed from a dielectric material, such as silicon nitride, different than the material forming the optical components 74, and the waveguide-to-waveguide coupler 84 may intervene to transfer propagating optical signals between the waveguide 78 and the optical components 74. In an embodiment, the waveguides 76, 78 may be formed from a fully-etched layer of the constituent dielectric material (e.g., silicon nitride). In an alternative embodiment, the waveguides 76, 78 may be formed from a partially-etched layer of the constituent dielectric material (e.g., silicon nitride) that includes a lower unetched connecting layer.

The waveguide bend 80 may be formed from a single-crystal semiconductor material (e.g., fully-etched single-crystal silicon from the device layer of an SOI wafer). The waveguide-to-waveguide coupler 86 may intervene to transfer propagating optical signals between the waveguide 76 formed from dielectric material (e.g., silicon nitride) and the waveguide bend 80 that is not formed from a dielectric material. The waveguide-to-waveguide coupler 88 may intervene to transfer propagating optical signals between the waveguide 78 formed from dielectric material (e.g., silicon nitride) and the waveguide bend 80 that is not formed from a dielectric material.

The waveguide-to-waveguide coupler 82 permits the material of the optical components 72 to differ from the material of the waveguide 76, and the waveguide-to-waveguide coupler 84 permits the material of the optical components 72 to differ from the material of the waveguide 76. The waveguide-to-waveguide coupler 86 permits the material of the waveguide bend 80 to differ from the material of the waveguide 76, and the waveguide-to-waveguide coupler 88 permits the material of the waveguide bend 80 to differ from the material of the waveguide 78. In the representative embodiment, each of the waveguide-to-waveguide couplers 82, 84, 86, 88 includes a taper composed of fully-etched single-crystal semiconductor material of the optical components 72, 74 and waveguide bend 80, as well as another taper composed of the dielectric material of the waveguides 76, 78 in which the tapers are arranged relative to each other to promote the transfer of propagating optical signals. Through the use of the waveguide-to-waveguide couplers 82, 84, 86, 88, the waveguides 76, 78 do not have to be formed from single-crystal semiconductor material (e.g., single-crystal silicon from the device layer of an SOI wafer) but may instead be formed from dielectric material (e.g., silicon nitride), which may permit a reduction in the footprint of the system 70 and/or a reduction of the propagation loss of optical signals traveling through the system 70.

In an alternative embodiment, the waveguides 76, 78 may be formed from partially-etched single-crystal semiconductor material (e.g., partially-etched single-crystal silicon from the device layer of an SOI wafer). In an alternative embodiment, only the waveguide 76 may be formed from partially-etched single-crystal semiconductor material (e.g., partially-etched single-crystal silicon from the device layer of an SOI wafer). In an alternative embodiment, the optical components 72, 74 may be formed from partially-etched single-crystal semiconductor material (e.g., partially-etched single-crystal silicon from the device layer of an SOI wafer). In an alternative embodiment, the optical components 72 may be formed from fully-etched single-crystal semiconductor material (e.g., fully-etched single-crystal silicon from the device layer of an SOI wafer), and the optical components 74 may be formed from partially-etched single-crystal semiconductor material (e.g., partially-etched single-crystal silicon from the device layer of an SOI wafer). In an alternative embodiment, the optical components 72 may be formed from fully-etched single-crystal semiconductor material (e.g., fully-etched single-crystal silicon from the device layer of an SOI wafer), the optical components 74 may be formed from partially-etched single-crystal semiconductor material (e.g., partially-etched single-crystal silicon from the device layer of an SOI wafer), and the waveguide 76 may be formed from partially-etched single-crystal semiconductor material.

In an alternative embodiment, the waveguide 76 and the optical components 72 may be formed from partially-etched single-crystal semiconductor material (e.g., partially-etched single-crystal silicon from the device layer of an SOI wafer), and the waveguide 78 and the optical components 74 may be formed from partially-etched single-crystal semiconductor material (e.g., partially-etched single-crystal silicon from the device layer of an SOI wafer). The waveguide-to-waveguide coupler 82 may be eliminated because the waveguide 76 and the optical components 72 are formed from the same material, and the waveguide-to-waveguide coupler 84 may be eliminated because the waveguide 78 and the optical components 74 are formed from the same material.

In an alternative embodiment, the optical components 72, 74 may be formed from a dielectric material, such as silicon nitride. Because the waveguide 76 is formed from the same dielectric material as the optical components 72 and the waveguide 78 is formed from the same dielectric material as the optical components 74, both of the waveguide-to-waveguide couplers 82, 84 may be eliminated.

In an alternative embodiment, the optical components 72, 74 and the waveguide 76 may be formed from partially-etched single-crystal semiconductor material (e.g., partially-etched single-crystal silicon from the device layer of an SOI wafer). Because the waveguide 76 and the optical components 72 are formed from the same material, the waveguide-to-waveguide coupler 82 may be eliminated.

In an alternative embodiment, the optical components 74 may be formed from dielectric material (e.g., silicon nitride), and the optical components 72 and waveguide 76 may be formed from partially-etched single-crystal semiconductor material (e.g., partially-etched single-crystal silicon from the device layer of an SOI wafer). Because the waveguide 76 and the optical components 72 are formed from the same material, the waveguide-to-waveguide coupler 82 may be eliminated. Because the waveguide 78 and the optical components 74 are formed from the same material, the waveguide-to-waveguide coupler 84 may be eliminated.

In an alternative embodiment, the optical components 72 may be formed from fully-etched single-crystal semiconductor material (e.g., fully-etched single-crystal silicon from the device layer of an SOI wafer), the optical components 74 may be formed from partially-etched single-crystal semiconductor material (e.g., partially-etched single-crystal silicon from the device layer of an SOI wafer), and both of the waveguides 76, 78 may be formed from partially-etched single-crystal semiconductor material (e.g., partially-etched single-crystal silicon from the device layer of an SOI wafer). Because the waveguide 78 and the optical components 74 are formed from the same material, the waveguide-to-waveguide coupler 84 may be eliminated.

In an alternative embodiment, the optical components 74 may be formed from partially-etched single-crystal semiconductor material (e.g., partially-etched single-crystal silicon from the device layer of an SOI wafer), and the waveguide 78 may be formed from partially-etched single-crystal semiconductor material. Because the waveguide 78 and the optical components 74 are formed from the same material, the waveguide-to-waveguide coupler 84 may be eliminated.

In an alternative embodiment, the optical components 72 may be formed from fully-etched single-crystal semiconductor material (e.g., fully-etched single-crystal silicon from the device layer of an SOI wafer), and the optical components 74 may be formed from dielectric material (e.g., silicon nitride). Because the waveguide 78 and the optical components 74 are formed from the same material, the waveguide-to-waveguide coupler 84 may be eliminated.

In an alternative embodiment, the optical components 74 may be formed from dielectric material (e.g., silicon nitride), and the waveguide 76 may be formed from partially-etched single-crystal semiconductor material (e.g., partially-etched single-crystal silicon from the device layer of an SOI wafer). Because the waveguide 78 and the optical components 74 are formed from the same material, the waveguide-to-waveguide coupler 84 may be eliminated.

In an alternative embodiment, the optical components 74 may be formed from dielectric material (e.g., silicon nitride), and the optical components 72 may be formed from partially-etched single-crystal semiconductor material (e.g., partially-etched single-crystal silicon from the device layer of an SOI wafer). Because the waveguide 78 and the optical components 74 are formed from the same material, the waveguide-to-waveguide coupler 84 may be eliminated.

Figure 15:
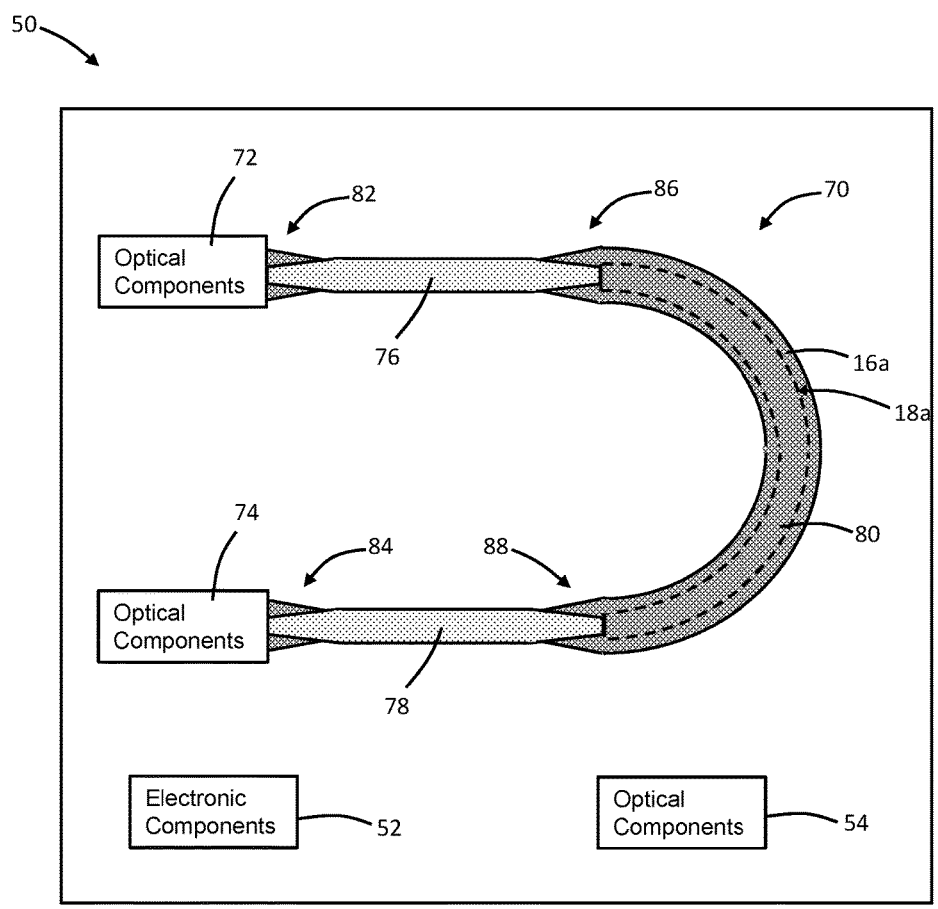
FIG. 15 is a diagrammatic top view of a photonic chip including a system in accordance with alternative embodiments of the invention.

With reference to FIG. 15 in which like reference numerals refer to like features in FIG. 12 and in accordance with alternative embodiments of the invention, the waveguide bend 80 of the system 70 may be replaced by a waveguide bend 90 that is modeled based on the waveguide bend of FIG. 7. The waveguide bend 80 may benefit from the stacked waveguide bends 16a, 18a. In addition, the waveguides 76, 78 may be constituted by a different material that either of the waveguide bends 16a, 18a. For example, the waveguides 76, 78 may be contain partially-etched dielectric material (e.g., silicon nitride), whereas the waveguide bend 80 may include a waveguide bend 16a that is formed from fully-etched single-crystal semiconductor material (e.g., single-crystal silicon) and a waveguide bend 18a that is formed from fully-etched dielectric material (e.g., silicon nitride) as described in the context of FIGS. 1-3.

References herein to terms such as "vertical", "horizontal", "lateral", etc. are made by way of example, and not by way of limitation, to establish a frame of reference. Terms such as "horizontal" and "lateral" refer to a direction in a plane parallel to a top surface of a semiconductor substrate, regardless of its actual three-dimensional spatial orientation. Terms such as "vertical" and "normal" refer to a direction perpendicular to the "horizontal" direction. Terms such as "above" and "below" indicate positioning of elements or structures relative to each other and/or to the top surface of the semiconductor substrate as opposed to relative elevation.

A feature "connected" or "coupled" to or with another element may be directly connected or coupled to the other element or, instead, one or more intervening elements may be present. A feature may be "directly connected" or "directly coupled" to another element if intervening elements are absent. A feature may be "indirectly connected" or "indirectly coupled" to another element if at least one intervening element is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a waveguide;
a first waveguide bend that is contiguous with the waveguide, the first waveguide bend having an inner surface curved in a first arc with a first arc length; and
a second waveguide bend spaced in a vertical direction from the first waveguide bend, the second waveguide bend having a first overlapping arrangement with the first waveguide bend in a lateral direction, the second waveguide bend having an inner surface curved in a second arc with a second arc length,
wherein the inner surface of the second waveguide bend over the second arc with the second arc length is concentric with the inner surface of the first waveguide bend over the first arc with the first arc length.

2. The structure of claim 1 wherein the first waveguide bend is arranged over the second waveguide bend, the first waveguide bend is comprised of silicon nitride, and the second waveguide bend is comprised of a single-crystal semiconductor material.

3. The structure of claim 1 wherein the second waveguide bend is arranged over the first waveguide bend, the first waveguide bend is comprised of a single-crystal semiconductor material, and the second waveguide bend is comprised of silicon nitride.

4. The structure of claim 1 wherein the first waveguide bend extends along the first arc having a first central angle, the second waveguide bend extends along the second arc having a second central angle, and the first central angle is substantially equal to the second central angle.

5. The structure of claim 1 wherein the first waveguide bend is arranged over the second waveguide bend, the second waveguide bend has a first end, and further comprising:
a first waveguide section that is contiguous with the first end of the second waveguide bend, the waveguide arranged over the first waveguide section.

6. The structure of claim 5 wherein the waveguide is lengthwise straight, the first waveguide section is lengthwise straight and aligned substantially parallel with the waveguide, the second waveguide bend has a second end, the first waveguide section includes a terminating tip that is arranged beneath the waveguide, and further comprising:
a second waveguide section that is contiguous with the second end of the second waveguide bend,
wherein the second waveguide section is lengthwise straight, and the second waveguide section includes a terminating tip that is arranged beneath the waveguide.

7. The structure of claim 5 wherein the waveguide is lengthwise straight, and the first waveguide section is lengthwise curved.

8. The structure of claim 5 wherein the waveguide is lengthwise straight, and the first waveguide section is lengthwise curved in an opposite direction from the second waveguide bend.

9. The structure of claim 5 wherein the first waveguide section has a length and a width that tapers along the length.

10. The structure of claim 1 wherein the second waveguide bend has a complex curvature described by an equation or formula.

11. The structure of claim 1 further comprising:
a third waveguide bend spaced in the vertical direction from the first waveguide bend and contiguous with the second waveguide bend, the third waveguide bend having a second overlapping arrangement with the first waveguide bend in the lateral direction.

12. A system comprising:
a waveguide bend comprised of fully-etched single-crystal semiconductor material;
a first plurality of optical components;
a second plurality of optical components;
a first waveguide arranged to couple the first plurality of optical components with the waveguide bend;
a second waveguide arranged to couple the second plurality of optical components with the waveguide bend; and
a first waveguide-to-waveguide coupler coupling the first waveguide to the waveguide bend.

13. The system of claim 12 further comprising:
a second waveguide-to-waveguide coupler coupling the second waveguide to the waveguide bend.

14. The system of claim 12 wherein the first waveguide is comprised of partially-etched single-crystal semiconductor material or silicon nitride, and the second waveguide is comprised of partially-etched single-crystal semiconductor material or silicon nitride.

15. The system of claim 12 wherein the first waveguide is comprised of silicon nitride, and the first waveguide-to-waveguide coupler is configured to couple the silicon nitride of the first waveguide with the fully-etched single-crystal semiconductor material of the waveguide bend.

16. A method comprising:
forming a waveguide and a first waveguide bend that is contiguous with the waveguide; and
forming a second waveguide bend that is spaced in a vertical direction from the first waveguide bend and that overlaps with the first waveguide bend in a lateral direction,
wherein the first waveguide bend has an inner surface curved in a first arc with a first arc length, the second waveguide bend has an inner surface curved in a second arc with a second arc length, and the inner surface of the second waveguide bend over the second arc with the second arc length is concentric with the inner surface of the first waveguide bend over the first arc with the first arc length.

17. The method of claim 16 wherein forming the second waveguide bend that is spaced in the vertical direction from the first waveguide bend and that overlaps with the first waveguide bend in the lateral direction further comprises:
patterning a device layer of a silicon-on-insulator wafer with a first lithography and etching process that etches fully through the device layer in the vertical direction to form the second waveguide bend.

18. The method of claim 17 wherein forming the waveguide and the first waveguide bend that is contiguous with the waveguide further comprises:
depositing a layer of silicon nitride; and
patterning the layer of silicon nitride with a second lithography and etching process to form the waveguide and the first waveguide bend.

19. The structure of claim 1 wherein the second waveguide bend has an outer curved surface, and the second waveguide bend has a constant width between the inner curved surface and the outer curved surface of the second waveguide bend over the arc length of the second arc.

20. The structure of claim 1 wherein the second waveguide bend has a first end and a second end each terminating the second arc, and the second arc length of the inner surface of the second waveguide bend is measured along the inner surface of the second waveguide bend from the first end to the second end.

* * * * *